Patented Aug. 5, 1947

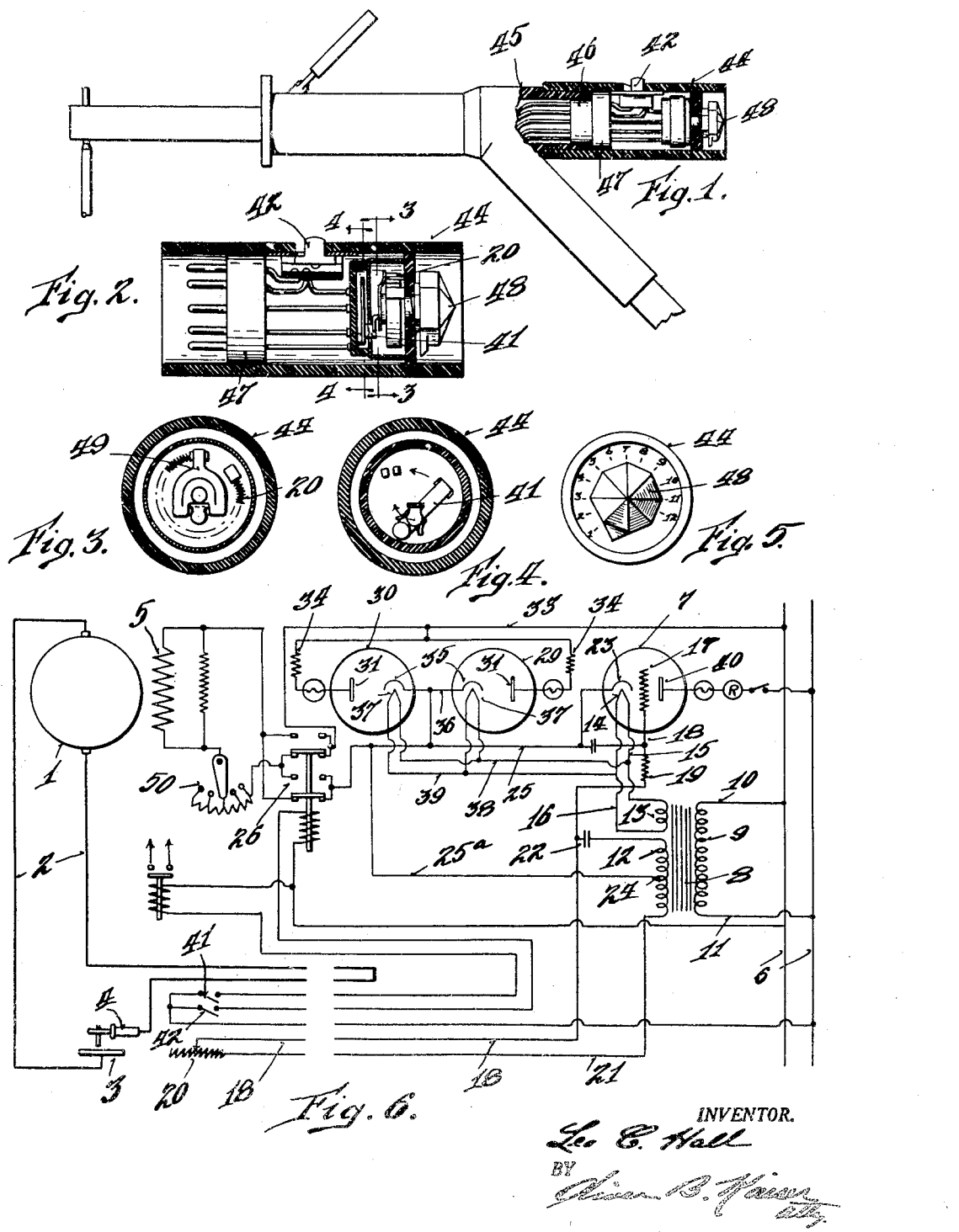

2,425,183

UNITED STATES PATENT OFFICE 2,425,183

CONTROLLER SYSTEM FOR ELECTRIC WELDING APPARATUS

Leo C. Hall, Cincinnati, Ohio

Application March 24, 1945, Serial No. 584,518

1 Claim. (Cl. 171—312)

This invention relates to a controlled thermionic regulator for sensitively regulating and varying the current output of an electric dynamo or generator, for electric welding operations, particularly of the type in which the welding current is passed between a pair of relatively movable electrodes, one which may be the work to be welded and the other, a rod or wire of metal to effect the weld.

To produce a satisfactory and efficient weld it is essential that the regulation be under the immediate control of the welder, at the point of welding performance or welding position of the operator, remote from the generator, as at the hand hold of the movable electrode, for impulsive and delicate regulation to adjust for the proper working requirements, as for example, necessitated after changing from one diameter size of the movable electrode to that of another, to sensitively regulate for minor changes required in connection with an electrode of any given size and in coordinating the rate of electrode movement with the rate of melting thereof.

The system is operative on an extremely low current, independent of and not in anywise influenced by the welding current, enabling the use of a miniature size of variable resistor applicable to or capable of being housed within the handle of a portable electrode holder for manual adjustment by the operator and to bring the control and means of regulation to the point of welding. The control is serviceable for a wider range of operation than is necessary in most cases so that the range can be restricted to whatever range is actually needed in practice, thereby materially reducing the controlling and adjusting action, and directed to obtain a welding current regulation with great sensitiveness and a degree of change or variation in a smooth order without interruption.

The system also permits the incorporation of a manually operative starting and stopping control and change in polarity of the welding current at the electrode holder in combination with the voltage and current regulation to the convenience of the operator, to avoid the necesstiy for him to leave his welding position to effect the same.

An object of the invention is to provide a regulator for a sensitive and precision regulation or variation of the voltage and current of an electric generator, effected by the operator at the point of welding to meet the conditions and requirements to produce a perfect and uniform weld and to avoid burned spots and improper fusing of the material to be welded.

Another object is to provide a simple and efficient system for governing the voltage and current of an electric generator for welding service, operative on comparatively low power and independent of the generator current so as not to be in anywise influenced thereby, and including a control element for direct manual manipulation, remote from the generator, as applicable to a portable electrode holder, by means of which, the operator at the point of welding may conveniently micrometrically regulate the welding current.

Another object is to provide a system for controlling the voltage and current of an electric generator for welding service, remotely from the generator by a simple and miniature size of portable control means for ready access and actuation by an operator at the point of service and with the adjustment micrometrically performed for the control range.

Various other features and advantages of the invention will be more fully apparent from the following description in connection with the accompanying drawings, depicting a preferred embodiment, and forming a part hereof, in which:

Figure 1 is a side elevation of an electrode holder with the handle portion broken away, illustrating a detachable control unit applied thereon and electrically coupled to a receiving socket mounted in the end of the handle.

Figure 2 is an enlarged sectional view of the control unit removed from the handle.

Figure 3 is a sectional view taken on line 3—3, Figure 2, detailing the rheostat element for the control unit.

Figure 4 is a sectional view taken on line 4—4, Figure 2, diagrammatically illustrating a control switch, operable coincidently with the control rheostat for a starting and stopping control.

Figure 5 is an end elevation of the portable control unit applicable to the hand hold of an electrode holder illustrating the manually operative knob for the control rheostat or variable resistor and dial associated therewith.

Figure 6 is a diagrammatic representation of the regulating system, shown as applied to control the voltage and current of a direct current generator preferably for electric welding service.

The system preferably is disclosed in connection with an arc welding system employing a generator, to govern the generator voltage and current output by controlling and varying the degree of excitation of the generator. The control apparatus primarily comprises a variable resistor connected through the intermediary of a space discharge device to the excitation circuit of the generator.

The control circuit is electrically independent of the generator welding circuit and for the voltage and current control of the generator permits the employment of a variable resistor of miniature size, capable of being housed directly within the conventional diameter size casing of the hand hold of an electrode holder, or applicable thereto, as an extension thereof, whereby the excitation of the field winding of the generator may be controlled and regulated remotely, by an operator at the point of welding.

Referring to Figure 6, of the drawings, depicting a regulator system to regulate or vary the voltage and current of a direct current generator 1, having its armature winding in connection with the conductors 2, for supplying the welding current to the relatively movable electrodes, one as 3, representative of the work to be welded and the other as a rod or wire of metal to effect the weld held by a portable holder 4, having a handle for hand grasp by the operator to appropriately maneuver the welding rod relative to the work for a welding performance.

Generally the electric generator is driven by an electric motor and the two combined as an organized unit, and in some instances transportable, the motor electrically connecting with a supply source and provided with suitable control appliances for starting and stopping, recognizing however, that any suitable means may be employed for driving the welding generator, and therefore the rotative power means is herein eliminated.

The generator field or field excitation winding 5, derives its excitation current from a suitable source of alternating current from the circuit lines 6, the controlled circuit including a controlled space discharge tube or rectifier 7, designated as a thyratron, as an element of the control and regulating system. The circuit is therefore separate and independent from the generator current, so as not to be in any wise influenced thereby.

The generator field excitation current is controlled and regulated by means of the regulating system, embodying a transformer 8, having a primary winding 9, connected to the electric service conductors 6, by conductors 10 and 11, respectively. The transformer has a plurality of secondary windings 12 and 13.

A filament 14 of the controlled tube 7, is energized by the secondary winding 13, of the transformer and connected therewith by conductors 15 and 16. The grid 17 of the tube 7, connects with a conductor 18, the conductor having in series therewith a protective resistor 19. The protective resistor 19, for the thyratron tube serves to limit grid currents to small values.

The conductor 18, connects with a variable resistor 20, which connects with one terminal of the secondary winding 12, of the transformer by a conductor 21. The conductor 18, connects with a second or opposite terminal of the secondary winding 12, of the transformer and includes therein, a condenser 22. The condenser 22, is inserted in a grid circuit for the purpose of establishing a proper electrical phase relationship between the grid voltage and the anode voltage.

A cathode 23, of the controlled tube 7, is supplied with current by a section of the secondary winding 12, of the transformer and connects thereto at a midway point 24, by conductors 25 and 25a. The conductor 25 connects to a terminal of a magnetically operated polarity switch 26. The magnetically operated polarity changing or reversing switch 26, is employed for remote control, as at the handle of a portable electrode holder, although it is obvious that a manual mechanically operated switch would be of equal service.

To maintain the current in the generator field during the periods when the thyratron tube 7, is not conducting, a pair of rectifier tubes 29 and 30, connected in parallel, are employed, although a single larger tube or other means of rectification would be of equal service. The plates 31, respectively, of the rectifier tubes 29 and 30, are connected by a common conductor 32, which in turn connects with a conductor 33, of the field winding exciting circuit which in turn connects with the supply circuit lines 6. A resistor 34, is inserted in series with each plate 31, respectively, to insure satisfactory division of the current between the two rectifiers 29 and 30.

The cathodes 35, respectively, of the rectifier tubes 29 and 30, are connected by a conductor 36, which in turn connects with the conductor 25, leading to a terminal of the polarity reversing switch 26. The filaments 37, respectively, of the rectifier tubes 29 and 30, are connected in parallel by conductors 38 and 39, respectively connected to the conductors 15 and 16, for the filament of the controlled tube 7 and the secondary winding 13, of the transformer 8.

The plate or anode 40, of the controlled tube 7, is connected with an appropriate conductor to the main service conductor lines 6, and which includes a protective fuse, time delay device and switch.

The electric condensor 22, inserted in the grid circuit of the controlled tube 7, establishes a proper electrical phase relationship between the control grid and anode voltage.

The output of the generator is governed by the field circuit primarily regulated by means of the variable resistor 20, shifting the value of the grid voltage with respect to the anode voltage. Under the arrangement shown only a relatively small current will ever pass through the control circuit and sufficient to control large amounts of current delivered to the electrodes. This permits the use of a relative miniature size of variable resistor or other type of variable control, manually operative and for precision regulation capable of being conveniently installed within or applicable to the conventional size of handle of a portable electrode holder, or within a casing which can be readily snapped onto the end of the handle of the electrode holder, as an extension thereof, without adding any appreciable weight to the holder or encumber the same and thereby bring the manually actuated elements within the hand grasp of the operator at the point of welding. It also permits the generator to be mounted at an elevated height from the floor, convenient to the work involved, permitting a reduction in length and size of cables required. Also, it is possible to suspend the cable, greatly reducing possibility of damage thereto.

Preferably the resistor is of a type employing an extremely fine wire closely coiled, having a rotative dial knob actuating a contact movable over the coil. The resistor also, preferably, unitarily embodies a switch arm 41, movable by the dial knob, for opening and closing a circuit for a starting and stopping control.

Referring to Figures 1 to 5 inclusive, 44 indicates a tubular or cylindrical shell or casing and may be representative of a handle of an electrode holder. As a unit detachable from the handle of the electrode holder, one end of the shell provides for making a slip-on or telescopic connection with the outer or free end of the handle 45, of the electrode holder, as an extension thereof, or to make a connection with a relatively stationary socket 46. A plug 47 is housed and fixed within the shell and is provided with the necessary number of connector prongs for making the plug-in circuit connections for the control system heretofore explained.

The shell carries a conventional type of electric switch 42, having a thumb knob accessible from the exterior of the shell which may be employed for operating the polarity reversing switch 26, remotely, as at the handle of the electrode holder. The variable resistor 20, is fixedly mounted within the shell and operated by a rotative dial knob 48, accessible to the operator for making the necessary control and regulation adjustments. The knob initially actuates a movable switch arm for a starting control and reversely at the end of a return stroke for a stopping control. The knob as its rotative movement is continued actuates a contact 49, bearing upon the resistance convolutions of the variable resistor 20, to vary and regulate the output of the controlled space discharge device or rectified tube 7. With the knob effective for operating the starting and stopping control at the initial end of its resistance controlling cycle of rotation, prevents starting at a high control setting.

The general construction of the electrode holder is optional and may constitute any conventional type; and in the form shown, provision is made for leading the conductors into a tubular limb extending at an angle from the handle.

The controller unit is readily applicable to a commercial generator unit, usually equipped with a rheostat, as indicated at 50, which can be advantageously utilized in connection with the present control system for an approximate generator current regulation followed by a sensitive setting in the regulation of the variable resistor 20, at the point of welding.

Having described the invention, I claim:

In an electric welding system, a direct current generator having a field winding, a circuit for supplying an exciting current to the field winding from a current source independent of the generator current, a grid controlled space discharge device having anode and cathode elements in said field winding exciting circuit, a grid circuit for the field winding exciting current control having an independent current supply, a manually regulatable variable resistor in said grid circuit, of a type for selectively sensitively varying the resistance of said resistor in said grid circuit for modifying the field winding exciting current and relatively governing the generator current and rectifier means in shunt connection with said field winding exciting circuit and intermediate of said controlled space discharge device and field winding.

LEO C. HALL.

REFERENCES CITED

The following references are of record in the file of this patent:

UNITED STATES PATENTS

| Number | Name | Date |
| --- | --- | --- |
| 1,664,022 | Churchward | Mar. 27, 1928 |
| 2,305,206 | Strabel | Dec. 15, 1942 |
| 846,422 | Oelschlager | Mar. 5, 1907 |

OTHER REFERENCES

Bulletin 5601, Ward Leonard Co., April 1937.